UNITED STATES PATENT OFFICE.

FRANK J. TONE, OF NIAGARA FALLS, NEW YORK.

PROCESS OF REDUCING COMPOUNDS WITH ELECTRICALLY-DEVELOPED HEAT.

No. 869,276.       Specification of Letters Patent.       Patented Oct. 29, 1907.

Application filed September 22, 1906. Serial No. 335,704.

*To all whom it may concern:*

Be it known that I, FRANK J. TONE, of Niagara Falls, Niagara county, New York, have invented a new and Improved Process for Reducing Compounds with Electrically-Developed Heat, of which the following is a specification.

This invention relates to the production of silicon in its elemental form.

In the processes heretofore described for the production of silicon it is usual to employ a mixture of carbon and silica of proportions substantially according to the equation $SiO_2 + 2C = Si + 2CO$. When using this mixture the evolution of CO gas is rapid and tends to carry with it from the furnace a certain quantity of vapor of the silicon, thus lowering the output of metal and the efficiency of the process. I have discovered that if a compound of silicon, oxygen and carbon is taken in which the silicon is already partially reduced and to this sufficient $SiO_2$ is added so that the total combined oxygen content of the mixture is satisfied by the carbon in the mixture for conversion into CO, the efficiency of the process is greatly increased and that the output is much larger for a given expenditure of power.

Silicon, carbon and oxygen combine in various proportions. When a mixture of silica and carbon containing 55 to 65 per cent. silica and the remainder carbon, is heated in an electric furnace at the lowest temperature at which combination takes place and reduction of silica begins, the product contains compounds of silicon, oxygen and carbon having the formulas $Si_2C_2O$; $Si_6C_6O$ and others, together with some free $SiO_2$ and free carbon. When using a mixture consisting of 61 per cent. silica and 39 per cent. carbon a typical analysis of such partially reduced product, neglecting impurities, is as follows:

Silicon 52 per cent.
Carbon 34 " "
Oxygen 14 " "

When this partially reduced material is used as a constituent of the charge mixture for the production of silicon, I have found it preferable to add $SiO_2$ in slight excess of that required for the complete conversion of all the carbon and oxygen into CO, in order to compensate for a certain amount of $SiO_2$ volatilized. The proportions I have found to work well in practice are 44 parts of $SiO_2$ and 56 parts of the silicon-carbon-oxygen compound heretofore described, which I place in an electrical furnace preferably such as described in my prior patent No. 745,122, dated Nov. 24, 1903, where I subject it to the action of electrically developed heat, and reduce the silicon to elemental form as therein described. The amount of CO gas evolved in the completion of the reaction is much less per unit of reduced silicon than when using a mixture of silica and carbon. This results in the reaction proceeding more quietly and in the loss by volatilization of silica and silicon being smaller.

I do not limit myself to the silicon-carbon-oxygen compounds heretofore described. Such compounds vary in composition, and any of them in which the $SiO_2$ is in a partially reduced state, such as siloxicon and the byproduct of the carborundum process sometimes called "white stuff" will fulfil the requirements of the process.

By material containing silicon in a partially reduced state I mean one in which the ratio of oxygen to silicon is less than in $SiO_2$; and by compounds in a partially reduced state I mean the state in which they have given up part but not all of their oxygen.

I claim:

1. The process of producing silicon, which consists in subjecting a mixture containing silica and a compound containing silicon, oxygen and carbon to electrically developed heat and reducing the silicon thereby to its elemental form.

2. The process of reducing silicon from its ores, which consists in first subjecting a mixture of carbon and siliceous material to electrically developed heat sufficient to partially reduce the silica, then mixing the silicon-carbon-oxygen product so formed with a further quantity of silica and subjecting said mixture to electrically developed heat sufficient to completely reduce the silicon to its elemental form.

3. The process of reducing to their elemental form, oxygen compounds having the property, when in a partially reduced state, of forming well-defined compounds with carbon, which consists in subjecting a mixture containing an oxid of the element and a compound resulting from partial reduction of the oxygen compound with carbon, and containing the element with oxygen and carbon, to electrically developed heat, and reducing said element thereby to its elemental form.

4. The process of reducing to their elemental form, oxygen compounds having the property, when in a partially reduced state, of forming well-defined compounds with carbon, which consists in first subjecting a mixture of carbon and the oxygen compound to electrically developed heat sufficient to partially reduce it and form a product containing carbon, oxygen and the compound, then mixing the product so formed with a further quantity of the compound and subjecting said mixture to electrically developed heat sufficient to completely reduce the compound to its elemental form.

In testimony whereof, I have hereunto set my hand.

FRANK J. TONE.

Witnesses:
ARTHUR BATTS.
L. L. DIEMER.